United States Patent [19]

Turnbull

[11] 4,354,223

[45] Oct. 12, 1982

[54] STEP-UP/STEP DOWN CHOPPER

[75] Inventor: Fred G. Turnbull, Scotia, N.Y.

[73] Assignee: General Electric Company, Schenectady, N.Y.

[21] Appl. No.: 298,664

[22] Filed: Sep. 2, 1981

[51] Int. Cl.³ .............................................. H02M 7/00
[52] U.S. Cl. .................... 363/124; 318/811; 363/41; 363/65
[58] Field of Search ................ 318/811; 363/41, 59, 363/60, 62, 65, 71, 124

[56] References Cited

U.S. PATENT DOCUMENTS

| | | | |
|---|---|---|---|
| 3,579,081 | 5/1971 | Bates | 363/65 X |
| 3,775,663 | 11/1973 | Turnbull | 321/9 |
| 3,986,097 | 10/1976 | Woods | 363/22 |
| 4,127,895 | 11/1978 | Krueger | 363/62 X |
| 4,161,023 | 7/1979 | Goffeau | 363/124 |
| 4,186,437 | 1/1980 | Cuk | 363/65 |
| 4,270,165 | 5/1981 | Carpenter et al. | 363/65 |

Primary Examiner—William M. Shoop
Attorney, Agent, or Firm—William H. Steinberg; James C. Davis, Jr.; Marvin Snyder

[57] ABSTRACT

A step-up/step-down pulse width modulated chopper circuit using power transistors is provided which allows the output voltage to be both decreased from its input value and increased from its input value and thereby made to follow a commanded prescribed reference waveform. A plurality of step-up/step-down choppers can be interconnected to provide single phase and multiphase ac outputs.

7 Claims, 12 Drawing Figures

STEP-UP/STEP DOWN CHOPPER

BACKGROUND OF THE INVENTION

This application is related to copending application Ser. No. 297,608 filed Aug. 21, 1981 entitled "Step-up Inverter" and assigned to the same assignee as the present invention.

This invention relates to power conditioners and more particularly to dc to dc choppers and dc to ac converters.

Conventional three phase motor drive dc to ac inverters are limited to a maximum value of line-to-line motor voltage imposed by the value of the dc input voltage. This maximum output voltage corresponds to the well-known six step operation that occurs when pulse width modulation ceases. For a dc input voltage of E, the maximum line-to-line fundamental RMS voltage is 0.780E. In the past, if an extended output voltage range was desired, for example, to maintain constant volts per Hertz operation, a step-up transformer could be coupled to the output of an inverter with the inherent weight and volume disadvantages of the transformer.

It is an object of the present invention to provide an inverter that is capable of step-up and step-down operation.

SUMMARY OF THE INVENTION

Briefly, in one embodiment of the present invention a step-up chopper providing a controllable dc output and capable of bidirectional power flow is coupled in series to a step-down chopper providing a controllable dc output and also capable of bidirectional power flow. The series combination receives input power from an external dc power source. A waveform generator is employed to provide a reference waveform having the desired frequency and amplitude of the output voltage of the chopper. A control circuit controls the switching of the step-up chopper when the desired output voltage is greater than the external dc supply and controls the switching of the step-down chopper when the desired output voltage is below the external dc supply, so that the reference waveform can be followed. The switching of the choppers occurs at a frequency higher than the desired output frequency.

In another embodiment, a single-phase inverter is made up of two step-up/step-down choppers. A common bus of each chopper is tied together and the output of the inverter is taken between the output of each of the choppers thereby removing the dc component of each chopper and providing an ac signal.

BRIEF DESCRIPTION OF THE DRAWING

The features of the invention believed to be novel, are set forth with particularity in the appended claims. The invention itself, however, both as to organization and method of operation, together with further objects and advantages thereof, may best be understood by a reference to the following description taken in conjunction with the following drawing in which:

DETAILED DESCRIPTION OF THE PREFERRED EMBODIMENT

Figure 1:
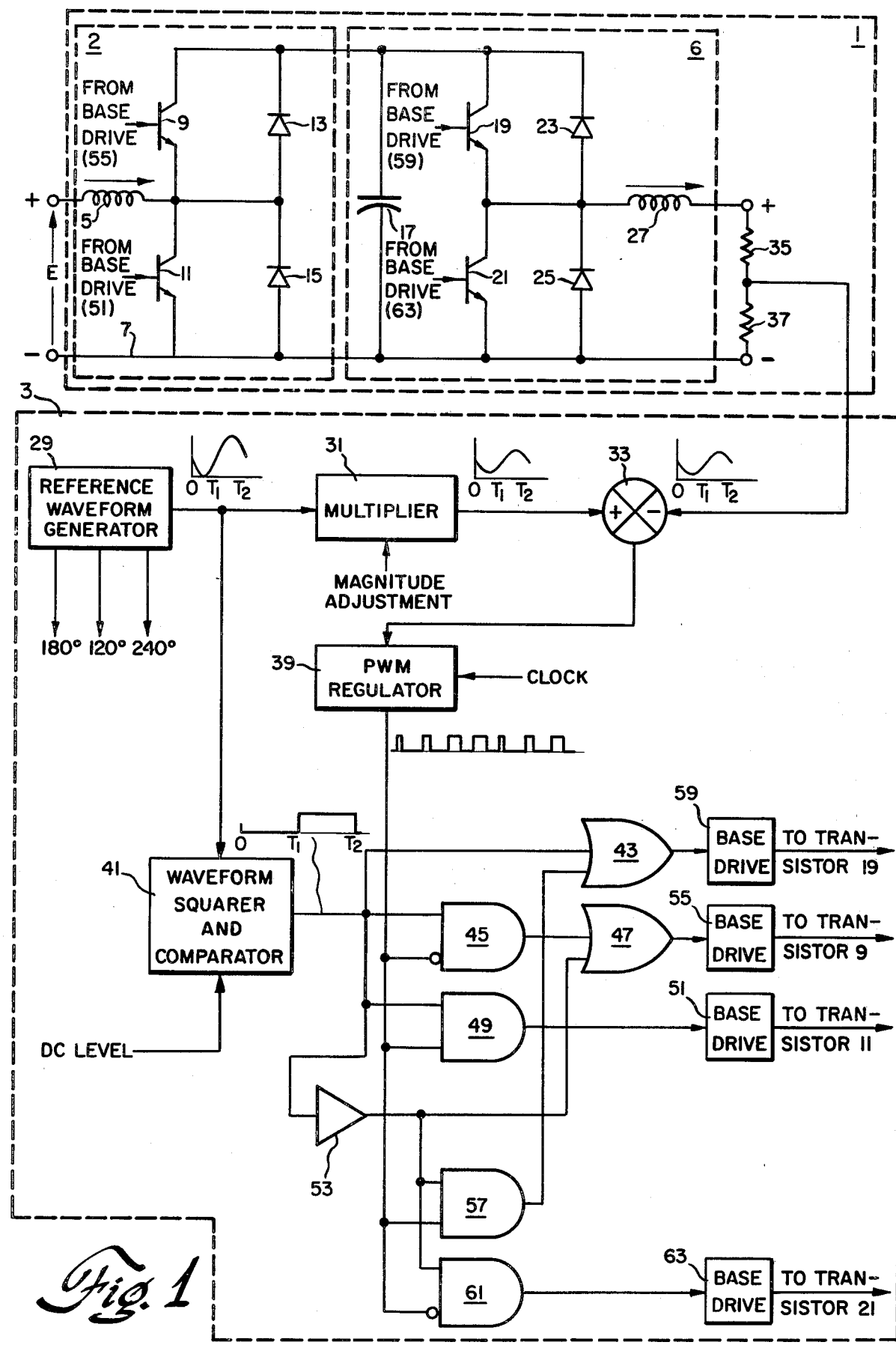
FIG. 1 is a part schematic, part block diagram representation of a step-up/step-down chopper and a control system in accordance with the present invention.

Referring now to the drawing and especially FIG. 1 thereof, a step-up/step-down chopper circuit 1 having a control circuit 3 is shown. The chopper circuit 1 includes a two-quadrant step-up chopper portion 2 having an inductor 5, a common negative bus 7, two power transistors 9 and 11, and two diodes 13 and 15. The inductor 5 is coupled to the positive side of an external dc supply not shown. The common negative bus 7 is coupled to the negative side of the external dc supply. The other side of inductor 5 is connected between the two NPN power transistors 9 and 11. The emitter of transistor 9 is connected to the collector of transistor 11, and also to the other side of inductor 5. The emitter of transistor 11 is connected to the negative bus 7. Connected across transistor 9 is diode 13 with the cathode of diode 13 connected to the collector of transistor 9. Similarly, diode 15 is in parallel with transistor 11 with the cathode of diode 15 connected to the collector of transistor 11. A step-down chopper portion 6 is connected in series with the output of the step-up chopper portion 2 and has a capacitor 17, two power transistors 19 and 21, two diodes 23 and 25 and an inductor 27. Capacitor 17 is connected between the cathode of diode 13 and the common bus 7. Connected in series across capacitor 17 are the two transistors 19 and 21. The collector of transistor 19 is connected to the cathode of diode 13. The collector of transistor 21 is connected to the emitter of transistor 19 and to one side of inductor 27. The emitter of transistor 21 is coupled to the negative bus 7. Diode 23 is connected in parallel across transistor 19 with the cathode of diode 23 connected to the collector of transistor 19. Similarly, diode 25 is connected in parallel with transistor 21. The cathode of diode 25 is connected to the collector of transistor 21. The output of the chopper circuit 1 is available between the other side of inductor 27 and the common bus 7.

The control circuit 3 includes a reference waveform generator 29 which provides a reference waveform to one input of multiplier 31. The reference waveform generator is capable of generating multiple output voltages which are phase shifted 180°, 120° and 240° relative to one another. An example of polyphase reference waveform generators is described in "Adjustable Voltage and Frequency Polyphase Sine Wave Signal Generator" by F. G. Turnbull and J. P. Walden, IEEE Transactions on Industry Applications, Vol. IA-12, No. 3, May/June 1976, pp. 312–316. The other input of multiplier 31 is suppled with a magnitude adjustment command voltage. The output of multiplier 31 is coupled to a positive input of summer 33. Connected to a negative input of summer 33 is a signal from a voltage divider comprising two resistors 35 and 37 connected across the output of the chopper circuit 1. The output of summer 33 is connected to a pulse width modulation (pwm) regulator 39. The regulator can be any one of a number of type presently available such as the regulating pulse width modulator model no. SG1525A manufactured by Silicon General of Garden Grove, Calif. The pwm regulator also receives an input voltage from a clock (not shown). The output of the waveform generator 29 is also coupled to a waveform squarer and comparator 41. The comparator portion of circuit 41 receives a dc level input voltage proportional to the external dc supply voltage. The output of the waveform squarer and comparator is coupled to a first input of an OR gate 43. An AND gate 45 receives at a non-inverting input a signal from waveform squarer and comparator 41 and at an inverting input terminal a signal from pwm regulator 39. The AND gate 45 output is coupled to a first input of an OR gate 47. An AND gate 49 receives an input signal from each of waveform squarer and comparator 41 and pwm regulator 39. The output of the AND gate 49 is connected to a base drive circuit 51 which is connected to the base of transistor 11. The output of waveform squarer and comparator 41 is connected to an input of a logic inverter 53. The output of the logic inverter 53 is coupled to a second input of OR gate 47. The output of OR gate 47 is coupled to a base drive circuit 55 which in turn is coupled to the base of transistor 9. The output of logic inverter 53 and the output of the pwm regulator 39 are each connected to a separate input respectively of AND gate 57. The output of AND gate 57 is connected to the second input of OR gate 43. The output of OR gate 43 is coupled to a base drive circuit 57 which in turn is connected to transistor 19. An AND gate 61 receives at a non-inverting terminal an input signal from logic inverter 53 and at an inverting terminal an input signal from the pwm regulator 39. The output of the AND gate 61 is connected to base drive circuit 63 which in turn is connected to the base of transistor 21.

The operation of FIG. 1 will now be described. Referring to FIG. 1, the waveform being generated by reference waveform generator 29 is assumed to be sinusoidal and have a maximum amplitude proportional to 2 E, where E is the dc voltage provided by the external power supply. During a time interval of $0-T_1$ which corresponds to one-half period of the reference waveform the magnitude of the waveform varies from E to 0 to E and during a subsequent time interval of $T_1$ to $T_2$ the magnitude varies from E to 2E to E. The reference waveform amplitude is controlled by a magnitude adjustment command applied to multiplier 31. The adjusted reference waveform is compared to a signal proportional to the actual output voltage from the voltage divider, which is made up of resistor 35 and 37, and summer 33. The error voltage from summer 33 is applied to pulse width modulation regulator 39 which is clocked by a high-frequency pulse of 10-20 kHz, which is much higher than the frequency of the reference waveform signal. The pulse width modulated signal provides pulses of varying width dependent on the magnitude and sign of the error. The pwm siganl is applied alternately to either transistor pair 9 and 11 or transistor pair 19 and 21 of the two quadrant step-up chopper and the two quadrant step-down chopper, respectively, depending on the magnitude of the reference waveform relative to the voltage of the external power source. "Two quadrant" refers to the ability of the choppers to operate with positive and negative current flow and a single polarity of voltage. The waveform squarer and comparator 41 separates the reference signal into two logic signals, one corresponding to the half-cycle from 0 to $T_1$ and the other to the second half-cycle from $T_1$ to $T_2$. The waveform squarer and comparator generates a square wave from the sinusoidal reference and then compares the square wave to the voltage level of the external dc source to generate the two logic signals. The output of the waveform squarer and comparator during the time interval from 0 to $T_1$ when the reference voltage is less than the dc voltage is a logical "0." The step-down chopper transistors 19 and 21 are alternately gated into conduction by base drive circuits 59 and 63, respectively, with the relative on-time of transistor 19 increasing and the on-time of transistor 21 decreasing with positive voltage error. AND gates 57 and 61 each receive a logical "1" signal during time interval 0 to $T_1$. AND gate 57 is enabled by pwm signals and activates base drive circuit 59 and AND gate 61 is enabled by the absence of pwm pulses and activates base drive circuit 63. The step-up chopper is not operating in the pwm mode at this time. Transistor 9 is continuously gated by the signal from the waveform squarer and comparator which is inverted by inverter 53, to provide a path for negative current from the external supply through the step-up chopper. Positive supply current is defined as current flowing from the supply to the chopper. Capacitor 17 is charged to the supply voltage through diode 13. Transitor 19 and diode 25 provide a path for positive load current with positive load current defined as current flowing from the output of the chopper to the load. Transistor 21 and feedback diode 23 provide a path for negative load current. Those skilled in the art will recognize that the load current direction does not necessarily follow the direction of the load voltage with an alternating voltage when the load is reactive.

During the time interval $T_1$ to $T_2$ the transistors 9 and 11 are alternately gated into conduction with positive voltage error from summer 33 causing the relative on-time of transistor 11 to increase and the on-time of transistor 9 to decrease. AND gate 49 and AND gate 61 receive a logical "1" signal during time interval $T_1$ to $T_2$. AND gate 49 is enabled by pwm signals and activates base drive circuit 51 and AND gate 61 is enabled nby the absence of pwm pulses and activates base drive circuit 63. A path for positive load current is provided by continuously gating transistor 19 to provide current path from capacitor 17 to inductor 27. The base drive circuit 59 being activated through OR gate 43. A path for positive source current is provided by transistor 11 and diode 13. Diode 13 charges capacitor 17 to a higher voltage than the input voltage when transistor 11 turns off. A path for negative source current is provided by transistor 9 and diode 15. The path for negative source current provides the second quadrant of operation. During time interval $T_1$ to $T_2$ the step-down chopper is not operating in the pwm mode but transistor 19 is continuously gated, providing a path for positive load current, and diode 23 provides a path for negative load current.

Figure 3:
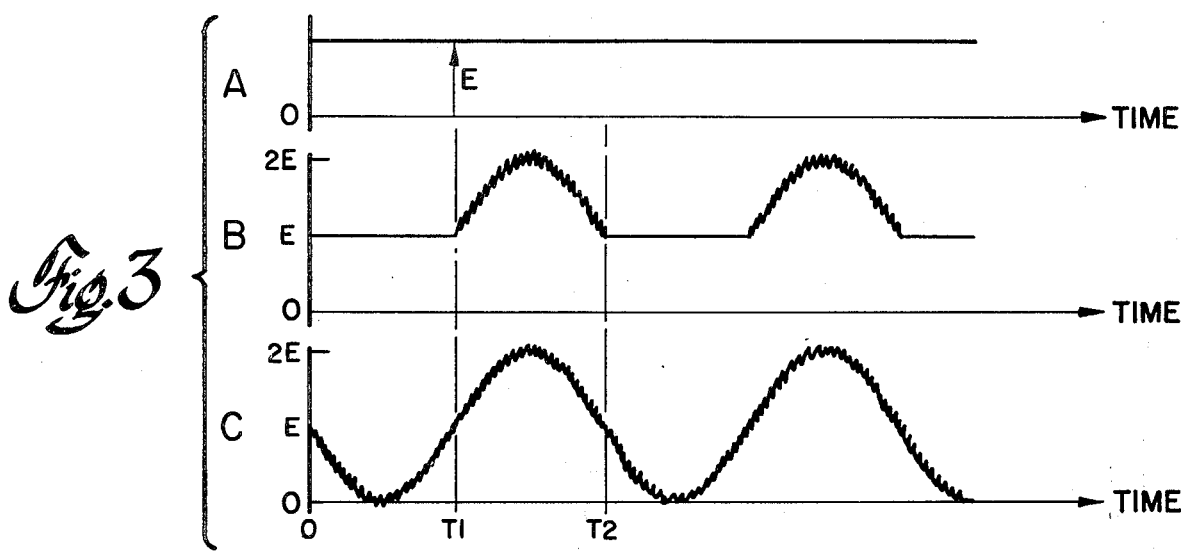
FIGS. 3A, B and C are voltage waveforms helpful in explaining the operation of FIGS. 1 and 2.

Referring to FIGS. 3A, 3B and 3C, voltage waveforms for the source voltage, the voltage across capacitor 17 and the output voltage are shown, respectively. The output voltage is seen to be sinusoidal, first being reduced from E to almost 0 and raised back to E and the increased to 2E and then lowered back to E in magnitude. The ratings of the step-up and step-down choppers are the same since the step-down chopper operates over the voltage range of E to 0 and the step-up chopper operates over the voltage range of E to 2E in a preferred embodiment.

If the step-up/step-down chopper is connected to a load capable of generating power and the voltage at the output during the time interval $0-T_1$ is greater than the desired voltage, the step-down chopper when viewed from the output side appears as a step-up chopper to the load. Since the transistors 19 and 21 will still be alternately enabled, positive current flows through inductor 27 and transistor 21 when transistor 21 is on. When transistor 21 turns off, current flows through diode 23 to charge capacitor 17 to a voltage larger than supplied by the load. Transistor 9 is gated on continuously during time interval 0 to $T_1$ and provides a path for positive current from the load to the external source. If power is generated by the load during the time interval $T_1$ to $T_2$ and the voltage at the load is greater than the desired voltage and therefore greater than the source voltage E, the step-up chopper when viewed from the load acts as step-down chopper. Diode 23 provides a path for positive current from the load for charging capacitor 17, and transistors 9 and 11, which are alternately gated, step down the voltage which is then coupled to the source. Transistors 19, which is gated continuously during the interval $T_1$ to $T_2$, carries negative current from the load.

Figure 2:
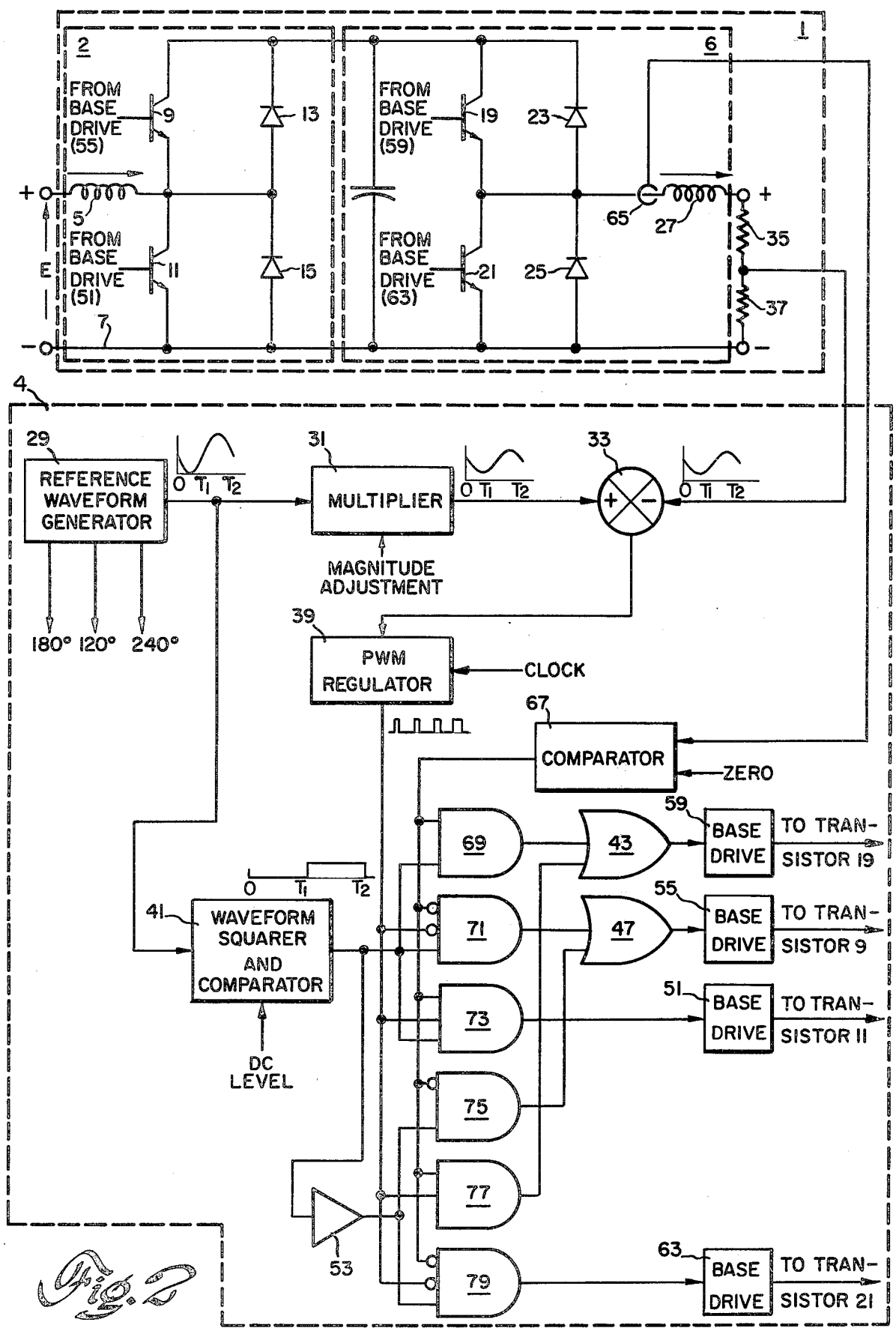
FIG. 2 is a part schematic, part block diagram representation of a step-up/step-down chopper and a different control system in accordance with the present invention.

Referring now to FIG. 2, elements corresponding to those in FIG. 1 are identified with identical reference designations. The step-up/step-down chopper 1 is the same as is shown in FIG. 1. The control circuit 4 is the same as control circuit 3, except as follows. An additional input is provided to the control circuit by a current sensor 65. The current sensor 65 is coupled to one input of a comparator 67 which has a second input maintained at a fixed voltage level which in the present embodiment is zero. An AND gate 69 is provided which receives an input signal from comparator 67 and an input signal from waveform squarer and comparator 41. The output of AND gate 69 is connected to the first input of OR gate 43. AND gate 45 of FIG. 1 is replaced by a three input AND gate 71 having the output of comparator 67 and the output of the pwm regulator, respectively, coupled to inverting input terminals and the output of the waveform squarer and comparator coupled to the other input terminal. The output of AND gate 71 is connected to the first input of OR gate 47. An AND gate 75 is added between the inverted output of logic inverter 53 and the second input of OR gate 47, the AND gate 75 receiving at an inverting terminal an input siganl from comparator 67. AND gate 57 of FIG. 1 is replaced by a three input AND gate 77 receiving input signals form comparator 67, pwm regulator 39, and logic inverter 53, respectively. The output of AND gate 77 is coupled to the second input of OR gate 43. AND gate 61 of FIG. 1 is replaced by three input AND gate 79 receiving input signals from the comparator 67 and pwm regulator 39, respectively, at inverting terminals, and logic converter 53 at non-inverting terminals. The output of AND gate 79 is coupled to base drive circuit 63.

The operation of the control of FIG. 2 will now be explained. In FIG. 1, provision was made for providing paths for positive and negative currents to flow regardless of the direction of actual current flow at any particular time. To reduce the amount of switching and therefore the losses associated with switching, a current sensor 65 in FIG. 2 determines current direction and generates a suitable logic signal. In the embodiment shown a logic "1" is generated for a positive current detected flowing to the load. If during the time interval 0 to $T_1$ positive current is detected flowing to the load, transistor 9 does not have to be on continuously, nor does transistor 21 need to be turned on when transistor 19 is turned off. Similarly, if negative current is sensed in sensor 65, transistor 19 does not have to be turned on. During the interval $T_1$ to $T_2$, if positive current is sensed flowing to the load, transistor 9 does not have to be enabled when transistor 11 turns off. If negative current is sensed, transistor 9 is enabled and transistor 11 is disabled. Transistor 19 which is otherwise continuously gated to provide a path for positive current is not switched on.

Negative current flow does not necessarily mean that power regeneration is occurring. With a reactive load and a sinusoidal output voltage waveform, positive and negative currents can occur both during regeneration as well as when power is being supplied by the external dc source.

Figure 4:
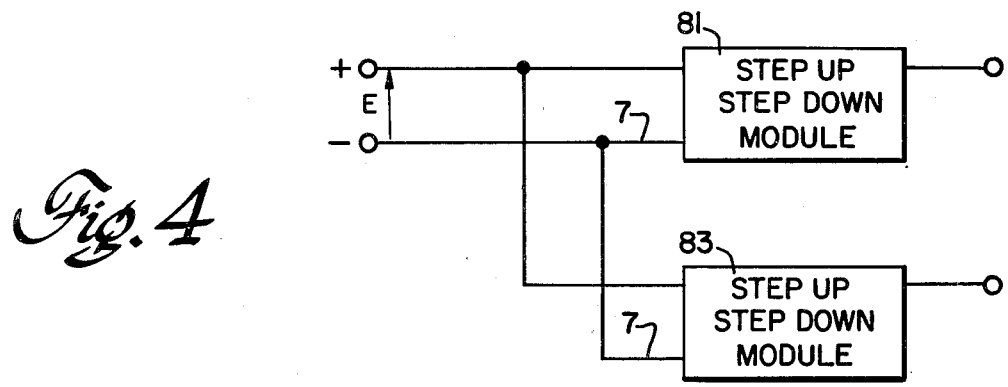
FIG. 4 is a block diagram representation of a single-phase inverter of the present invention.
Figure 5:
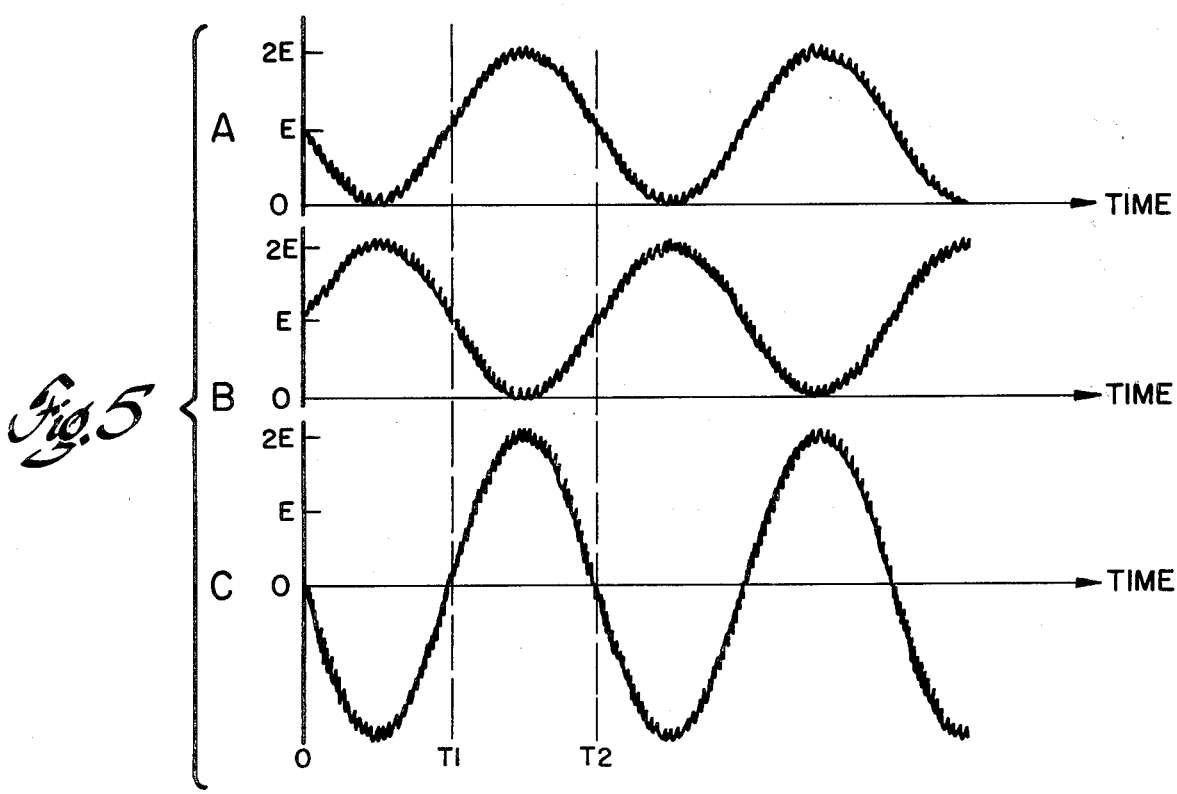
FIGS. 5A, B and C are voltage waveform diagrams helpful in explaining the operation of FIG. 4.

Referring now to FIG. 4, an inverter is shown configured of two step-up/step-down choppers combined in a module having either the controls 3 or 4 shown in FIG. 1 or FIG. 2, respectively, and labelled step-up/step-down module. The modules are connected together by the common bus 7 shown in FIGS. 1 and 2 and the output is taken between the output terminals of each module. The output voltages of each chopper are shown in FIGS. 5A and B. The resulting waveform available between the two output terminals is shown in FIG. 5C. The output available between the two terminals results in a signal without a dc component since the dc components in the output waveform of both choppers are equal. If the output of the two step-up/step-down choppers are 180° out of phase, a sinusoidal signal having an amplitude of 2E and no dc component is obtained. The relative phase difference between the output of the two choppers is achieved by having a phase difference between their reference waveforms.

A single phase (180° phase shift) or a polyphase (120° phase shift) reference waveform may be generated by providing multiple outputs from the reference waveform generator 29 shown in FIGS. 1 and 2. The basic frequency reference pulse would be generated at a multiple of the desired output frequency and digitally phase shifted with ring counters and digital logic circuits.

Figure 6:
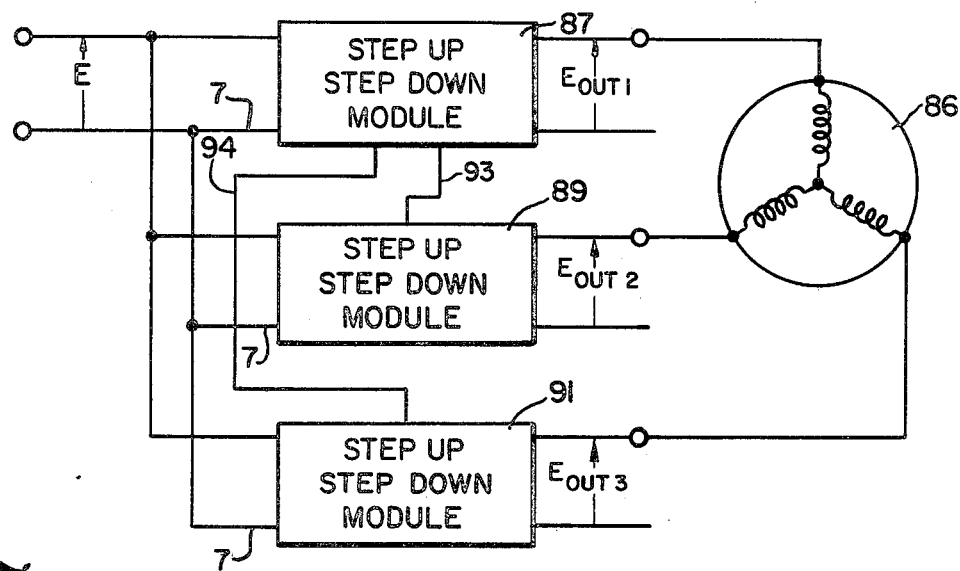
FIG. 6 is a block diagram representation of a three-phase inverter in accordance with the present invention.

A three phase, three wire load such as a polyphase motor 86 can be supplied by the arrangement shown in FIG. 6. Three step-up/step-down modules 87, 89 and 91, are connected to one another by their common bus 7. Each step-up/step-down module is supplied from an external dc voltage source. The output of each of the step-up/step-down modules is connected to one phase of the load. The reference waveform generator of the step-up/step-down module 87 supplies module 89, which is connected to the second phase of the load and module 91 which is connected to the third phase of the load with phase shifted reference waveforms shifted 120° and 240° respectively via lines 93 and 94.

Figure 7:
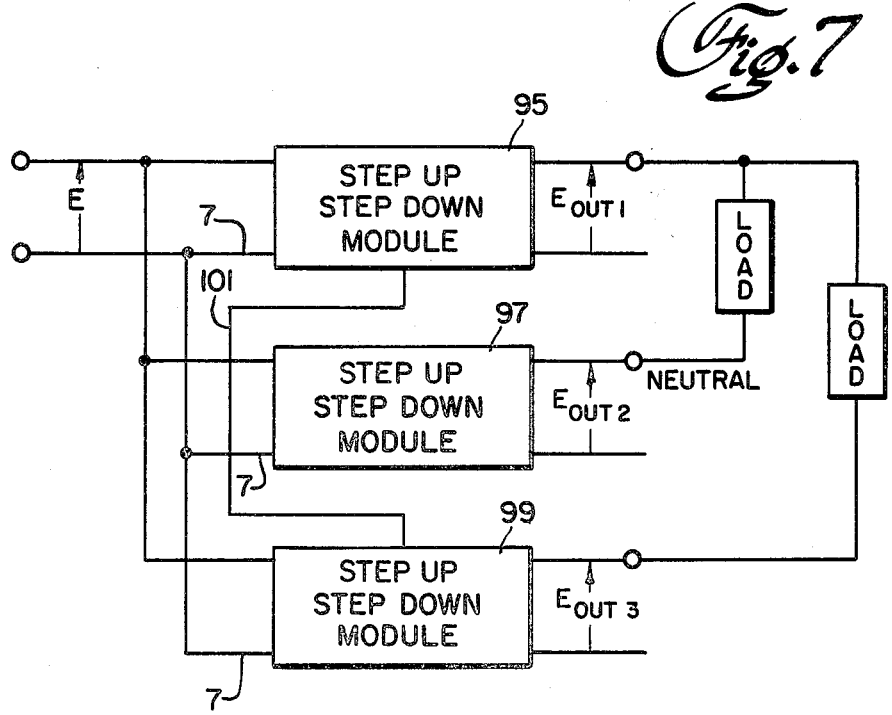
FIG. 7 is a block diagram representation of a single phase three wire system in accordance with the present invention.

A single phase, three wire dc output capable of supplying a line-to-line and line-to-neutral voltage can be obtained as shown in FIG. 7. Three step-up/step-down modules 95, 97 and 99 are connected together by their common bus. An external source supplies dc power to each chopper. The step-up/step-down chopper 97 connected to the neutral has a reference waveform which is a fixed voltage such as zero and this chopper acts as a current source or current sink to maintain the potential at the neutral line at a controlled voltage independent of the neutral current flow in or out of the neutral terminal. The other two step-up/step-down modules 95 and 99 have reference waveform signals which are 180° out of phase relative to one another. Line 101 carries the 180° phase shifted reference waveform from module 95 to module 99.

Figure 8:
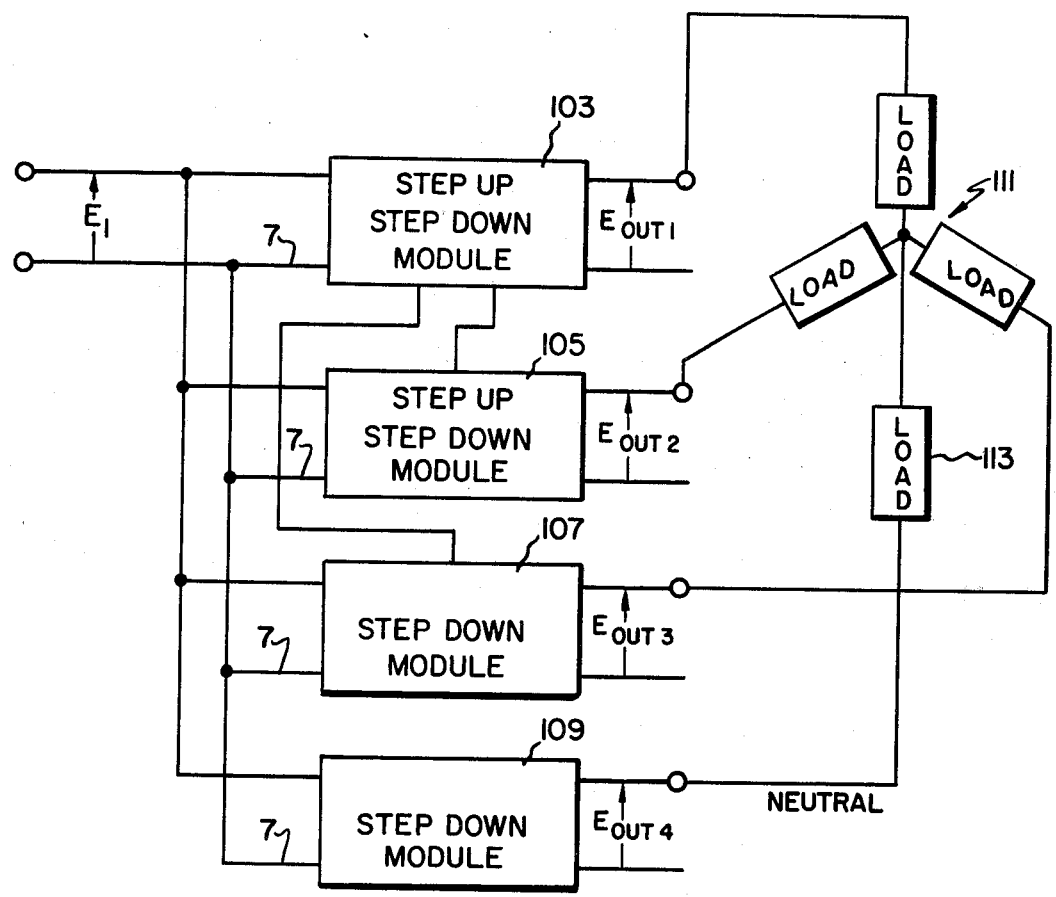
FIG. 8 is a block diagram representation of an inverter supplying a three phase system with a line-to-neutral load in accordance with the present invention.

Three phase systems having a line to neutral load can be utilized with the configuration shown in FIG. 8. Four step-up/step-down modules 103, 105, 107 and 109 are each supplied by an external dc power supply and the common bus of each module is interconnected with the others. The load 111 shown connected in a wye configuration has a line to neutral load 113. The output of module 109 is connected to the neutral load 113. The reference waveform generator of module 113 supplies a fixed potential such as zero and the module acts as a current source or sink to maintain the potential at the neutral terminal at fixed voltage independent of neutral current flow into and out of the neutral terminal. A similar technique is described in my U.S. Pat. No. 3,775,663 entitled "Inverter with Electronically Controlled Neutral Terminal" issued Nov. 27, 1973 and assigned to the same assignee as the present invention. Each of the other modules 103, 105 and 107 is connected to a different one of the three phase loads with the reference waveform of the modules phase shifted 120° relative to one another.

A step-up/step-down pulse width modulated chopper has been described which allows the output voltage to be both decreased from its input value and increased from its input value and thereby follow a commanded prescribed reference waveform.

While the invention has been particularly shown and described with reference to several preferred embodiments thereof, it will be understood by those skilled in the art that various changes in form and details may be made therein without departing from the spirit and scope of the invention.

What is claimed is:

1. A chopper circuit comprising:
   a step-up dc-dc chopper portion capable of bidirectional power flow and providing a variable dc output voltage;
   a step-down dc-dc chopper portion capable of bidirectional power flow and providing a variable dc output voltage, said step-down chopper portion coupled in series with said step-up chopper portion, the series combination of choppers receiving input power from an external dc power source;
   means for generating a signal representative of the desired output voltage waveform; and
   means for controlling the switching of said step-up chopper portion to follow said desired output voltage waveform when the magnitude of said desired waveform is greater than said external dc power source voltage and for controlling the switching of said step-down chopper portion to follow said desired output waveform when the magnitude of the desired output waveform is less than the external dc power source voltage.

2. The chopper circuit of claim 1 wherein said means for controlling the switching comprises means for monitoring the direction of current flow in said chopper circuit and switching only those controllable switches needed for carrying current through the chopper in the detected direction.

3. The chopper circuit of claim 1 wherein said step-up dc-dc chopper portion comprises two controllable switch means and said step-down dc-dc chopper portion comprises two controllable switch means.

4. The chopper circuit of claim 3 wherein said means for controlling comprises means for alternately switching on said two controllable switches of said step-up chopper portion to follow said desired output voltage waveform when the magnitude of said desired waveform is greater than said external dc power source voltage and for alternately switching on said two controllable switches of said step-down choppers to follow said desired output waveform when the magnitude of the desired output waveform is less than the external dc power source voltage.

5. An inverter comprising:
   a plurality of step-up/step-down chopper circuits each having:
      a step-up dc-dc chopper portion capable of bidirectional power flow and providing a variable dc output voltage;
      a step-down dc-dc chopper portion capable of bidirectional power flow and providing a variable dc output voltage, said step-down chopper portion coupled in series with said step-up chopper portion, the series combination of choppers receiving input power from an external dc power source;
   means for generating a signal representative of the desired output voltage waveform of said chopper;
   means for controlling the switching of said step-up chopper portion to follow said desired output voltage waveform when the magnitude of said desired waveform is greater than said external dc power source voltage and for controlling the switching of said step-down chopper portion to follow said desired output waveform when the magnitude of the desired output waveform is less than the external dc power source voltage;
   said step-up/step-down chopper circuits each having a common bus, said common bus of each said step-up/step-down chopper circuit being interconnected to one another;
   the output voltages of said inverter being provided at an output terminal of each of said step-up/step-down chopper circuits.

6. The inverter of claim 5, further comprising means for phase shifting each of the signals representative of the desired output waveform of said chopper by a predetermined amount relative to one another.

7. The inverter of claim 5 wherein said means for controlling the switching comprises means for monitoring the direction of current flow in each of said chopper circuits and switching only those controllable switches needed for carrying current through each chopper in the detected direction.

* * * * *